US012726435B2

(12) United States Patent
Yu et al.

(10) Patent No.: US 12,726,435 B2
(45) Date of Patent: Sep. 1, 2026

(54) INFORMATION FLOW RECOGNITION METHOD, NETWORK CHIP, AND NETWORK DEVICE

(71) Applicant: ALIBABA GROUP HOLDING LIMITED, George Town (KY)

(72) Inventors: Nianbing Yu, Hangzhou (CN); Yisong Qiao, Hangzhou (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 31 days.

(21) Appl. No.: 18/352,830

(22) Filed: Jul. 14, 2023

(65) Prior Publication Data

US 2024/0022507 A1 Jan. 18, 2024

Related U.S. Application Data

(63) Continuation of application No. PCT/CN2022/071915, filed on Jan. 14, 2022.

(30) Foreign Application Priority Data

Jan. 18, 2021 (CN) ......................... 202110062885.8

(51) Int. Cl.
*H04L 45/00* (2022.01)
*H04L 45/02* (2022.01)

(52) U.S. Cl.
CPC .............. *H04L 45/38* (2013.01); *H04L 45/02* (2013.01)

(58) Field of Classification Search
CPC ................................ H04L 45/38; H04L 45/02

(Continued)

(56) References Cited

U.S. PATENT DOCUMENTS

2014/0233421 A1 8/2014 Matthews
2014/0237118 A1* 8/2014 Matthews .............. H04L 47/32 709/226

(Continued)

FOREIGN PATENT DOCUMENTS

CN 106453129 A 2/2017
CN 109240965 A 1/2019

(Continued)

OTHER PUBLICATIONS

PCT International Search Report and Written Opinion mailed Apr. 26, 2022, issued in corresponding International Application No. PCT/CN2022/071915 (10 pgs.).

(Continued)

*Primary Examiner* — Ario Etienne
*Assistant Examiner* — Kidest Mendaye
(74) *Attorney, Agent, or Firm* — Osha Bergman Watanabe & Burton LLP

(57) ABSTRACT

A network chip includes a main control chip and an off-chip memory. The main control chip includes an on-chip memory configured to cache a message entering the network chip; a flow classification module configured to map the message in the on-chip memory to at least one piece of flow table information; a flow recognizing module configured to recognize a potential flow that is a possible target flow in the information flow according to the at least one piece of flow table information, and output the flow table information corresponding to the potential flow to the off-chip memory to be accumulated; and a flow screening module configured to read the flow table information corresponding to the potential flow accumulated in the off-chip memory when a set trigger condition is met, and recognize a target flow in the potential flow based on the read flow table information.

19 Claims, 6 Drawing Sheets

(58) Field of Classification Search
USPC .......................................................... 709/238
See application file for complete search history.

(56) References Cited

U.S. PATENT DOCUMENTS

| | | | |
|---|---|---|---|
| 2015/0163142 A1* | 6/2015 | Pettit | H04L 49/3009 370/230 |
| 2015/0163144 A1 | 6/2015 | Koponen et al. | |
| 2016/0105343 A1 | 4/2016 | Janarthanan et al. | |
| 2017/0005953 A1* | 1/2017 | Bracha | H04L 49/9084 |
| 2017/0118090 A1* | 4/2017 | Pettit | H04L 67/10 |

FOREIGN PATENT DOCUMENTS

| | | | |
|---|---|---|---|
| CN | 110808854 * | 2/2020 | H04L 41/12 |
| CN | 110808910 A | 2/2020 | |
| CN | 111970211 A | 11/2020 | |
| WO | WO2022152230 A1 | 7/2022 | |

OTHER PUBLICATIONS

Guo et al., “Two-stage storage flow tracking system based on service identification system architecture,” Computer Engineering and Design, vol. 34, No. 11, 3780-3784, 2013.

European Patent Office Communication issued for Application No. 22739106.7 the Supplementary European Search Report (Art. 153(7) EPC) and the European search opinion dated May 13, 2024, 16 pages.

Lall et al., “An Efficient Algorithm for Measuring Medium-to Large-sized Flows in Network Traffic,” IEEE Infocom 2009, 5 pages, 2019.

* cited by examiner

INFORMATION FLOW RECOGNITION METHOD, NETWORK CHIP, AND NETWORK DEVICE

CROSS-REFERENCE TO RELATED APPLICATIONS

The disclosure claims the benefits of priority to PCT Application No. PCT/CN2022/071915, filed on Jan. 14, 2022, which claims the benefits of priority to Chinese Application No. 202110062885.8, filed Jan. 18, 2021, both of which are incorporated herein by reference in their entireties.

TECHNICAL FIELD

The present disclosure relates to network communication technologies, more particular, to an information flow recognition method, a network chip, and a network device.

BACKGROUND

In a data center network, there are many information flows, and some information flows may need to be recognized in some scenarios. For example, for an Elephant Flow, in order to improve the processing efficiency of the elephant flow, a flow table of the elephant flow is usually placed in an on-chip cache to reduce the number of accesses to an off-chip cache, so it is required to recognize the elephant flow.

Currently, flow table information of each received information flow may be temporarily stored in the off-chip cache, then the flow table information of each information flow may be read from the off-chip cache, and accurate statistics is performed on each information flow according to the read flow table information, thereby recognizing the elephant flow therefrom. However, an access bandwidth of the off-chip cache is low, resulting in a slow recognition speed and low efficiency.

SUMMARY OF THE DISCLOSURE

Embodiment of the present disclosure provide a network chip including a main control chip and an off-chip memory. The main control chip includes an on-chip memory configured to cache a message entering the network chip; a flow classification module having circuitry configured to map the message in the on-chip memory to at least one piece of flow table information, wherein one piece of flow table information corresponds to one information flow; a flow recognizing module having circuitry configured to recognize a potential flow that is a possible target flow in the information flow according to the at least one piece of flow table information, and output the flow table information corresponding to the potential flow to the off-chip memory to be accumulated; and a flow screening module having circuitry configured to read the flow table information corresponding to the potential flow accumulated in the off-chip memory when a set trigger condition is met, and recognize a target flow in the potential flow based on the read flow table information.

Embodiments of the present disclosure provide an information flow recognition method, applicable to a main control chip in a network chip. The method includes caching a message entering the network chip into an on-chip memory of the network chip, and mapping the message in the on-chip memory to at least one piece of flow table information, wherein one piece of flow table information corresponds to one information flow; recognizing a potential flow that is a possible target flow in the information flow according to the at least one piece of flow table information; outputting the flow table information corresponding to the potential flow to an off-chip memory of the network chip to be accumulated; and reading the flow table information corresponding to the potential flow accumulated in the off-chip memory when a set trigger condition is met, and recognizing a target flow in the potential flow based on the read flow table information.

Embodiments of the present disclosure provide a network device. The network device includes a memory configured to store a computer program; a processor coupled to the memory and configured to execute the computer program, for sending a message to the network chip and/or receiving identification information of a target flow reported by the network chip; and a network chip including a main control chip and an off-chip memory. The main control chip includes an on-chip memory configured to cache a message entering the network chip; a flow classification module having circuitry configured to map the message in the on-chip memory to at least one piece of flow table information, wherein one piece of flow table information corresponds to one information flow; a flow recognizing module having circuitry configured to recognize a potential flow that is a possible target flow in the information flow according to the at least one piece of flow table information, and output the flow table information corresponding to the potential flow to the off-chip memory to be accumulated; and a flow screening module having circuitry configured to read the flow table information corresponding to the potential flow accumulated in the off-chip memory when a set trigger condition is met, and recognize a target flow in the potential flow based on the read flow table information.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1A:
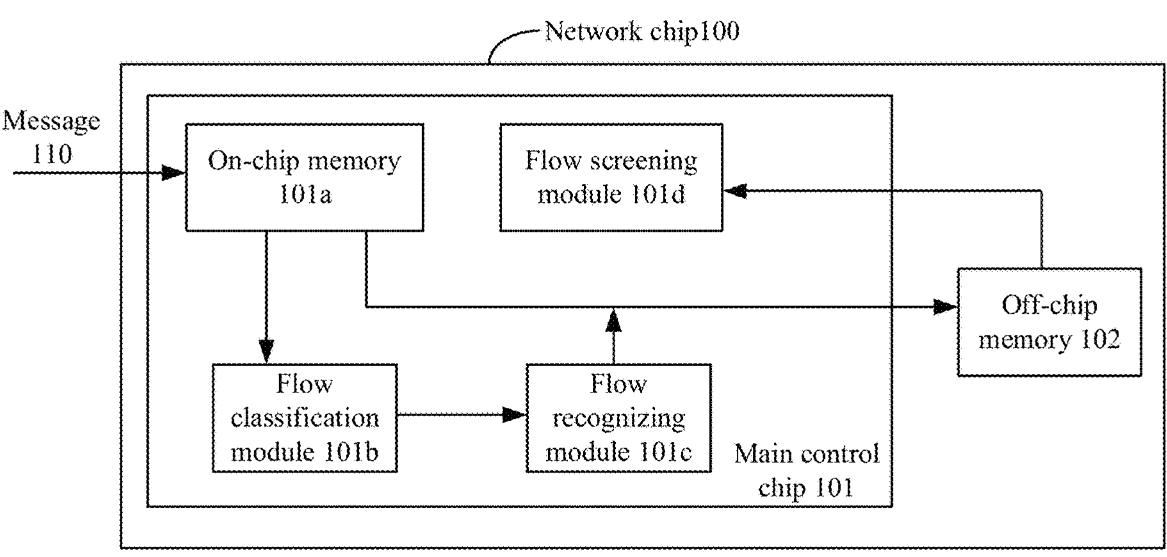
FIG. 1A is a schematic structural diagram of an exemplary network chip, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

For the problem of a low information flow recognition efficiency, embodiments of the present disclosure provide a solution, and a basic idea lies in that: a combination of an on-chip memory and an off-chip memory is used for recognizing an information flow. First, a message entering a network chip is cached in the on-chip memory, the message is mapped to at least one piece of flow table information in the on-chip memory, and a potential flow that is a possible target flow in the information flow is recognized accordingly. Then, the flow table information of the potential flow is cached to the off-chip memory to be accumulated. Until a set trigger condition is met, the flow table information of the potential information flow accumulated in the off-chip memory is read to accurately recognize the target flow in the potential flow accordingly. Firstly, a potential flow is recognized by taking advantage of a large access bandwidth of the on-chip memory, which can increase the speed of recognizing the potential flow. Then, only the potential flow is further recognized by taking advantage of a large storage space of the off-chip memory, rather than further recognizing all information flows by the off-chip memory, which can reduce the number of accesses to the off-chip memory and benefit to improve the efficiency and accuracy of recognizing a target flow.

In various embodiments of the present disclosure, data of the network chip that passes through the same network within the same period of time and has certain common features or attributes is referred to as an information flow. For example, data with the same 4-tuple, 5-tuple, or 7-tuple within a certain period of time may be regarded as an information flow, or data from the same IP address within a period of time may also be regarded as an information flow, or data that accesses the same IP address within a period of time may also be regarded as an information flow. In various network systems, there are various network devices such as servers, switches, routers, or hubs. These network devices usually include network chips, and the network chip can realize functions such as data transmission and reception, data encapsulation and decapsulation, link management, and data encoding and decoding. In addition, in some application scenarios, the network chip is also required to recognize an information flow.

For example, the information flow in the network system can be classified into an elephant flow and a Mice Flow. The elephant flow is a process of transferring large amounts of data continuously through a network link, for example, virtual machine migration or data migration and so on. The mice flow is a process of transferring small amounts of short-term data through a network link, for example, sending an email, browsing a web page, and sending an instant message. The study found that once a mice flow appears subsequent to an elephant flow in a queue at an outlet terminal of a network switch, a long queue delay is caused. In order to optimize or ensure the transmission performance of the mice flow and alleviate the delay, it is very important to recognize the elephant flow.

For another example, in a cloud computing scenario, a cloud tenant may be interested in or pay more attention to the traffic in some scenarios. For example, the cloud tenant is an online education service provider who has deployed online education services including various subjects such as English, Mathematics, and Chinese on the cloud, and pays more attention to online traffic of the English subject in the online education services. In this case, it is necessary to recognize information flows involved in the English subject specified by the cloud tenant, and perform traffic statistics on the recognized information flows.

In some embodiments, in order to realize information flow recognition under various scenarios or requirements, and improve the efficiency and accuracy of recognizing an information flow, a network chip is provided. The network chip may use a combination of an on-chip memory and an off-chip memory to recognize the information flow, so as to meet the purpose of information flow recognition under various scenarios or requirements. The network chip has a hardware structure and may be implemented based on an integrated circuit chip such as a Field Programmable Gate Array (FPGA), a Complex Programmable Logic Device (CPLD), or a single-chip microcomputer. In the present disclosure, an internal implementation structure of the network chip is not limited. FIG. 1A is a schematic structural diagram of an exemplary network chip, according to some embodiments of the present disclosure. As shown in FIG. 1A, a network chip 100 at least includes: a main control chip 101 and an off-chip memory 102 disposed outside main control chip 101. Main control chip 101 includes: an on-chip memory 101*a*, a flow classification module 101*b*, a flow recognizing module 101*c*, and a flow screening module 101*d*. In some embodiments, on-chip memory 101*a* may be an on-chip cache, and off-chip memory 102 may be an off-chip cache.

On-chip memory 101*a* is located on main control chip 101, and off-chip memory 102 is located outside main control chip 101. Relatively speaking, an access bandwidth of on-chip memory 101*a* is higher than an access bandwidth of off-chip memory 102. However, a storage capacity of off-chip memory 102 may be larger, while a capacity of on-chip memory 101*a* is relatively small. In view of this, on-chip memory 101*a* is mainly configured to temporarily cache some information to be processed by main control chip 101. Off-chip memory 102 is configured to cache information that does not need to be processed immediately. For the information stored in off-chip memory 102, main control chip 101 may first load the information from off-chip memory 102 to on-chip memory 101*a* when the information is needed to be processed.

In a practical application, main control chip 101 needs to perform various processing on a message entering network chip 100. The processing includes, but is not limited to, recognizing an information flow where the message is located. The embodiments of the present disclosure focus on the description of a process of the main control chip 101 performing the information flow recognition. For example, in an application scenario of traffic control, the elephant flow may be recognized, so that speed limit processing such as speed limit or packet loss may be performed on the elephant flow in time to solve the congestion problem. For another example, in a cloud computing scenario, an information flow specified by a cloud tenant may be recognized, so that the cloud tenant may perform subsequent processing or operations on the specified information flow. In a scenario of information flow recognition, after receiving a message 110, network chip 100 first caches the message 110 in on-chip memory 101*a*, and with the advantage of a large access bandwidth of on-chip memory 101*a*, flow classification module 101*b* and flow recognizing module 101*c* cooperate with each other to complete preliminary flow recognition.

For example, flow classification module 101*b* may read the cached message 110 from on-chip memory 101*a* and map the message 110 to at least one piece of flow table information. One piece of flow table information corresponds to one information flow, and different pieces of flow table information correspond to different information flows. The implementation in which flow classification module 101*b* reads a message from on-chip memory 101*a* is not limited. For example, when on-chip memory 101*a* caches a new message, flow classification module 101*b* reads the new message from on-chip memory 101*a*, and maps the new message to a piece of flow table information. In some embodiments, flow classification module 101*b* periodically reads messages cached by on-chip memory 101*a*, and maps the read messages to corresponding flow table information, respectively, for example, a reading cycle may be 1 s, 2 s, 5 s, or the like, which is not limited here.

In the present embodiments, flow classification module 101*b* can not only map the message cached in on-chip memory 101*a* to at least one piece of flow table information, but also provide at least one piece of flow table information to flow recognizing module 101*c*. In some embodiments, flow classification module 101*b* may output at least one piece of flow table information to flow recognizing module 101*c*, or flow recognizing module 101*c* may read at least one piece of flow table information from flow classification module 101*b*. The flow table information corresponding to each information flow mainly includes some information related to the information flow, such as statistical information related to the information flow, some header information (such as 5-tuple) of the information flow, and the next operation (referred to as action information of the information flow) corresponding to the information flow. In the present embodiments, the statistical information related to the information flow is focused on, and the statistical information may vary due to different flow recognition requirements. For example, to recognize an elephant flow, the statistical information in the flow table information may include but not limited to: the quantity of messages that have appeared in the information flow, a time stamp of the message, identification information of the information flow, or the like. For another example, to recognize the information flow specified by the user (referred to as a specified flow), the flow table information may include but not limited to: whether label information, a time stamp of the message, identification information of the information flow, or the like are carried by the message in the information flow. In the present embodiments, the label information is used for distinguishing whether the message is a message in the specified flow, if it is a message in the specified flow, the label information is carried, if it is not a message in the specified flow, the label information is not carried. In some embodiments, if the message carries the label information, the label information may also be used as a specific flow table information, which is reflected in the flow table information corresponding to the information flow to which the message belongs. For ease of description, in the embodiments of the present disclosure, the information flow that needs to be recognized is referred to as a target flow, and the target flow may be an elephant flow, a specified flow, or include both an elephant flow and a specified flow.

In the present embodiments, flow recognizing module 101*c* may recognize a potential flow that is a possible target flow from an information flow according to at least one piece of flow table information provided by flow classification module 101*b*. The potential flow refers to an information flow that may be a target flow. In the present embodiments, in order to improve the recognition efficiency, save the storage space of on-chip memory 101*a*, and ensure that each information flow entering the network chip can be recognized, in a preliminary recognition process, the information flow may be initially recognized based on flow table information obtained from a small quantity of messages. For example, for each information flow, flow table information (mainly referring to statistical information) corresponding to messages arriving within is or a specified quantity (such as 20) of messages may be acquired, flow recognizing module 101*c* roughly recognizes the information flow according to the flow table information.

For the potential flow recognized by flow recognizing module 101*c* that may be the target flow, the potential flow may be further recognized in combination with the flow table information (mainly statistical information) obtained from a larger quantity of messages, so as to improve the accuracy of the recognition result. In order to facilitate the accumulation of the flow table information corresponding to the potential flow, after the potential flow is recognized, the flow table information corresponding to the potential flow cached in on-chip memory 101*a* may be output to off-chip memory 102 to be accumulated. The advantage of large storage space of off-chip memory 102 is used to continue to accumulate flow table information corresponding to potential flows, so that the flow table information is more abundant. In some embodiments, for other information flows that are not recognized as potential flows, flow table information corresponding to these information flows may be deleted from on-chip memory 101*a*, so that the storage space of on-chip memory 101*a* may be released, and the space utilization of on-chip memory 101*a* may be improved.

In the present embodiments, flow screening module 101*d* is further configured to precisely recognizing the potential flow recognized by flow recognizing module 101*c*, according to the flow table information obtained from more message statistics, so as to determine whether the potential flow is a target flow. A trigger condition may be set for flow screening module 101*d*. When the set trigger condition is met, flow screening module 101*d* reads the flow table information corresponding to the accumulated potential flows in off-chip memory 102, and recognize the target flow in the potential flow based on the read flow table information. It should be noted that, for the potential flow, the flow table information read by flow screening module 101*d* from off-chip memory 102 is usually different from the flow table information output from on-chip memory 101*a*, and the flow table information in off-chip memory 102 is obtained based on a larger quantity of messages, while the flow table information in on-chip memory 101*a* is obtained based on a relatively small quantity of messages. Compared with the flow table information output by on-chip memory 101*a*, the flow table information read by flow screening module 101*d* from the off-chip memory 102 is more abundant and more accurate. In some special cases, there may be no messages in the information flow for a long period of time, and therefore, the two types of flow table information may also be the same.

The set trigger condition may be that the calculated quantity of messages in the flow table information cached in off-chip memory 102 exceeds a set quantity threshold, so that when the calculated quantity of messages in the flow table information cached in off-chip memory 102 exceeds the set data threshold, flow screening module 101*d* may read the flow table information corresponding to the accumulated potential flows in off-chip memory 102. In some embodiments, flow recognizing module 101*c* maintains the above-mentioned quantity threshold, calculates an accumulative quantity of messages in the flow table information output each time, and sends a trigger signal to flow screening module 101*d* when the accumulative quantity of messages exceeds the set quantity threshold. When receiving the trigger signal sent by flow recognizing module 101*c*, flow screening module 101*d* reads the flow table information corresponding to the accumulated potential flows in off-chip memory 102. In some embodiments, a timing cycle may also be set, and expiration of the timing cycle may be used as a set trigger condition, so that flow screening module 101*d* may read the flow table information corresponding to the accumulated potential flows in off-chip memory 102 when each timing cycle expires.

For example, it is assumed that flow recognizing module 101*c* recognizes a potential flow based on the flow table information obtained from messages arriving within 1 second (that is, the first time-length), while the flow screening module 101*d* further precisely recognizes a potential flow based on the flow table information obtained from messages arriving within 3 seconds (that is, the second time-length). In this way, if the flow table information output by flow recognizing module 101*c* from on-chip memory 101*a* to off-chip memory 102 each time is obtained from the messages arriving within 1 second, as flow recognizing module 101*c* continuously outputs the flow table information to off-chip memory 102 to be accumulated, the flow table information corresponding to the potential flows accumulated in off-chip memory 102 may become increasingly more abundant, so that when the timing cycle of 3 seconds expires, flow screening module 101*d* may read the flow table information obtained according to statistics of messages arriving within 3 seconds from off-chip memory 102. Flow screening module 101*d* can recognize potential flows based on the flow table information obtained from more message statistics. Therefore, the information on which flow recognition is based is more abundant and more representative, which is conducive to improving the accuracy of the recognition result. The target flow may be accurately recognized from the potential flows. The first time-length is shorter than the second time-length, the first time-length being 1 second and the second time-length being 3 seconds is just an example of values, which is not limited thereto.

In the embodiments of the present disclosure, a combination of an on-chip memory and an off-chip memory is used for recognizing an information flow. First, a message entering a network chip is cached in the on-chip memory, the message is mapped to at least one piece of flow table information on the chip (that is, main control chip 101), and a potential flow that is a possible target flow in the information flow is recognized accordingly. Then, the flow table information corresponding to the potential flow is output to the off-chip memory to be accumulated, and until a set trigger condition is met, the flow table information corresponding to the potential flow cached in the off-chip memory is read to recognize the target flow in the potential flows accordingly. Accordingly, a potential flow is recognized by taking advantage of a large access bandwidth of the on-chip memory, which can increase the speed of recognizing the potential flow. Then, only the flow table information corresponding to the potential flow is further accumulated by taking advantage of a large storage space of the off-chip memory, and the potential flow is further recognized, rather than further recognizing all information flows by the off-chip memory, which can reduce the number of accesses to the off-chip memory and help improve the efficiency and accuracy of recognizing a target flow.

In this implementation, the target flow may be an elephant flow or a specified information flow. According to different target flows, a detailed process of recognizing the target flow by network chip 100 is also different. Illustration is made below for different cases.

In some embodiments, the target flow is an elephant flow.

In the present embodiments, message 110 entering network chip 100 is first sent to on-chip memory 101*a* on main control chip 101 for caching. On main control chip 101, flow classification module 101*b* maps the message 110 cached in on-chip memory 101*a* to at least one piece of flow table information. In the present embodiments, the implementation in which flow classification module 101*b* maps the message cached in on-chip memory 101*a* to at least one piece of flow table information is not limited. Illustration is made below by using an example.

In some embodiments, flow classification module 101*b* may map the message 110 cached in on-chip memory 101*a* to at least one piece of flow table information according to feature information of the message. The feature information of the message may be a 4-tuple, a 5-tuple, or a 7-tuple of the message. The 4-tuple includes: a source IP address, a destination IP address, a source port, and a destination port. The 5-tuple includes: a source IP address, a destination IP address, a protocol number, a source port, and a destination port. The 7-tuple includes: a source IP address, a destination IP address, a protocol number, a source port, a destination port, a service type, and an interface index. For example, messages with the same 4-tuple may be mapped to the same piece of flow table information, or messages with the same 5-tuple may be mapped to the same piece of flow table information, which is not limited.

In some embodiments, the message cached in on-chip memory 101*a* may be mapped to at least one piece of flow table information by using a Hash function. For example, a hash table is maintained in on-chip memory 101*a*. The hash table includes a certain quantity of entries, each entry corresponding to an information flow, which on the one hand for recording the flow table information corresponding to the information flow, and on the other hand for recording a hash result of the information flow, different hash results representing different information flows. In other words, an entry records the hash result and flow table information of the information flow corresponding to the entry. For the message cached in on-chip memory 101*a*, flow classification module 101*b* maps, by using the hash function, the message cached in on-chip memory 101*a* to the hash table in on-chip memory 101*a*, for example, to an entry in the hash table.

In some embodiments, each time when on-chip memory 101*a* caches a new message, flow classification module 101*b* may read the new message from on-chip memory 101*a*, extract feature information of the new message, and hash the feature information of the new message by using the hash function to obtain a hash result of the new message. For example, if the feature information of the new message is a source IP address and a source port in the message, the source IP address and the source port in the new message may be arranged sequentially to form a string of numbers, and the string of numbers may be hashed to obtain the hash result of the new message. Messages having the same source IP address and source port may correspond to the same hash result, that is, they may be mapped to the same entry. After the hash result of the new message is obtained, the hash result may be matched in the hash table. If there is a target entry corresponding to the hash result in the hash table, it indicates that an information flow to which the message belongs has been recorded in the hash table, the new message is mapped to the target entry, and flow table information in the target entry is updated, for example, adding 1 to the quantity of messages and recording a time stamp of the new message. If there is no target entry corresponding to the hash result in the hash table, it indicates that an information flow to which the new message belongs is the latest information flow, and the information flow has not been recorded in the hash table. Then, an idle entry is acquired from the hash table, and the new message is mapped to the idle entry, which specifically refers to recording flow table information of the information flow to which the new message belongs in the idle entry, for example, recording the quantity of messages as 1, and recording a time stamp of the new message and an information flow identifier.

In some embodiments, the quantity of entries in the hash table is limited, for example, there are 10, 20, or 25 entries. Acquiring an idle entry from the hash table may be classified into two situations. A first situation is that there are idle entries in the hash table, and one idle entry may be directly selected from the idle entries, and the new message is mapped to the selected idle entry. A second situation is that there is no idle entry in the hash table, then flow table information in an entry that meets an output condition in the hash table may be output to flow recognizing module 101*c*, and the flow table information in the entry may be deleted after being output to flow recognizing module 101*c*, thus obtaining a blank entry. The output condition may be that if the quantity of messages exceeds a set threshold, an entry is randomly selected from the entries whose quantities of messages exceed the set threshold, and flow table information in the entry is output to flow recognizing module 101*c*, thereby obtaining a blank entry. In some embodiments, the output condition may be outputting flow table information in an entry corresponding to the largest quantity of messages in the hash table to flow recognizing module 101*c*. In some embodiments, the output condition may be that a maximum difference between message time stamps in entries exceeds a set threshold, an entry is randomly selected from the entries whose maximum difference between message time stamps exceeds the set threshold and flow table information in the entry is output to flow recognizing module 101*c*, which is not limited.

In the present embodiments, on the basis of the above hash table, flow recognizing module 101*c* and flow classification module 101*b* may adopt a pipeline operation method, that is, flow recognizing module 101*c* waits for flow classification module 101*b* to output flow table information to flow recognizing module 101*c*, and each time when receiving the flow table information output by flow classification module 101*b*, makes statistics, according to the received flow table information, on whether an information flow corresponding to the received flow table information is a potential flow. When the target flow is an elephant flow, flow recognizing module 101*c* calculates the bandwidth of the information flow corresponding to the received flow table information, and recognizes the information flow as a potential flow when the bandwidth is greater than a set bandwidth threshold. For example, a difference between time stamps included in the flow table information may be calculated, and a ratio of the quantity of messages in the flow table information to the time stamp difference may be calculated, which is the bandwidth of the information flow. For example, a bandwidth threshold of an elephant flow may be set. If the bandwidth of the information flow is greater than the set bandwidth threshold of the elephant flow, the information flow is considered to be a potential elephant flow.

In the present embodiments, considering that flow recognizing module 101*c* recognizes whether the information flow belongs to an elephant flow based on the flow table information obtained from the statistics on a small quantity of messages, some information flows with burst traffic in a short period of time may be misrecognized as elephant flows. In other words, there may actually be some mice flows with short-term burst traffic in the elephant flows recognized by flow recognizing module 101*c*. Therefore, the elephant flows recognized by flow recognizing module 101*c* are referred to as potential elephant flows, which means that the potential elephant flows need to be further screened to obtain a true elephant flow. Based on this, after the potential elephant flow is recognized, flow table information corresponding to the potential elephant flow cached in on-chip memory 101*a* may be output to off-chip memory 102 to be accumulated, so as to accumulate more abundant flow table information by using the space advantage of off-chip memory 102. In conjunction with this, a flow screening module 101*d* is arranged on main control chip 101, and flow screening module 101*d* is configured to read the flow table information corresponding to the potential elephant flows that has been accumulated in off-chip memory 102 when a set trigger condition is met, and perform further recognition on the potential elephant flows based on the read flow table information, so as to recognize a true elephant flow in the potential elephant flows and eliminate a false elephant flow. There may be one potential elephant flow or a plurality of potential elephant flows.

In the present embodiments, an implementation in which flow screening module 101*d* recognizes the target flow from the potential elephant flow based on the read flow table information corresponding to the potential elephant flow is not limited. For example, flow screening module 101*d* may perform statistics on the bandwidth of the potential elephant flow according to the read flow table information corresponding to the potential elephant flow, and recognize a potential elephant flow whose bandwidth exceeds a set elephant flow bandwidth threshold as a true elephant flow; and recognize a potential elephant flow whose bandwidth does not exceed the set elephant flow bandwidth threshold as a mice flow. For another example, the bandwidth of each potential elephant flow may be calculated, and the potential elephant flows may be sorted according to the bandwidth from large to small, and first N potential elephant flows that occupy 80% to 100% of the network bandwidth may be recognized. The first N potential elephant flows are recognized as true elephant flows, and remaining potential elephant flows are recognized as mice flows.

In some embodiments, the target flow is a specified flow.

Figure 1B:
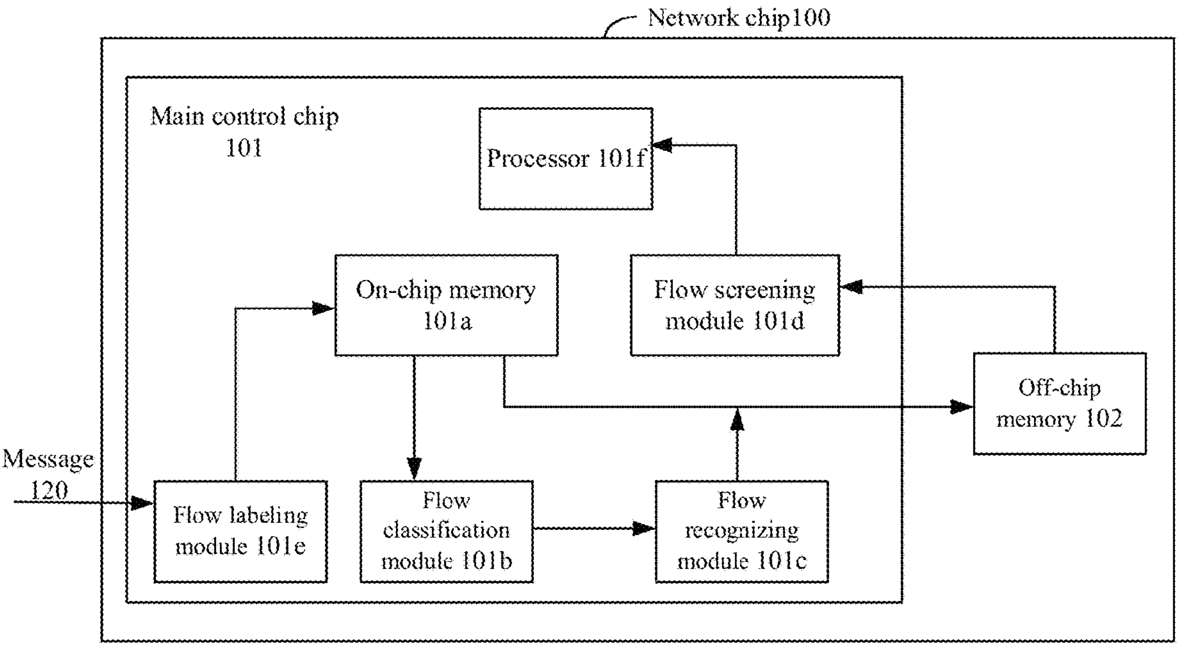
FIG. 1B is a schematic structural diagram of another exemplary network chip, according to some embodiments of the present disclosure.

In the present embodiments, as shown in FIG. 1B, the main control chip is further provided with a flow labeling module 101*e*. Before a message 120 entering network chip 100 is cached to on-chip memory 101*a*, flow labeling module 101*e* is configured to determine whether the message 120 entering network chip 100 is a message in a specified flow according to feature information of the message 120. If the message 120 entering network chip 100 is a message in a specified flow, label information is added in the message 120. The label information is used for identifying whether the message 120 belongs to the specified flow. The label information may be used as a type of specific flow table information, and may be recorded in flow table information of the specified flow. The label information may be a number, a character string, or a combination of a number and a character string, which is not limited here.

In the present embodiments, an upper-layer application may deliver feature information of the message 120 in the specified flow to flow labeling module 101*e* in advance, or a relevant operator may configure the feature information of the message 120 in the specified flow to flow labeling module 101*e*. In this way, when receiving the message, flow labeling module 101*e* may extract feature information from the message, and compare the feature information extracted from the message with the feature information of the message in the specified flow stored locally. If the feature information extracted from the message and the feature information of the message in the specified flow stored locally are the same, the message is determined to be the specified flow, label information is added in the message, and the message with the added label information is sent into on-chip memory 101*a* for caching. If the feature information extracted from the message and the feature information of the message in the specified flow stored locally are different, the message is directly sent into on-chip memory 101*a* for caching. For example, if a source IP address of the message in the specified flow is IP1 and a source port is M, whether a source IP address in the feature information of the message is IP1 and whether a source port is M can be determined. If the source IP address in the feature information of the message is IP1 and the source port is M, the message is considered to be the message in the specified flow, and label information corresponding to the specified flow is added to the message. If the source IP address in the feature information of the message is not IP1 or the source port is not M, the message is considered not to be a message in the specified flow.

In the present embodiments, flow classification module 101*b* can map the message cached in on-chip memory 101*a* to at least one piece of flow table information, and output at least one piece of flow table information to flow recognizing module 101*c*. When flow classification module 101*b* recognizes that the message carries label information, the label information is recorded as a specific flow table information into the flow table information corresponding to the information flow. In other words, the flow table information includes the quantity of messages, the time stamp, and whether there is label information added by flow labeling module 101*e*. For a specified flow, the flow table information includes label information; and for a non-specified flow, the flow table information does not include label information. For the implementation in which flow classification module 101*b* maps the message cached in on-chip memory 101*a* to at least one piece of flow table information, reference may be made to the foregoing embodiment, and details are not repeated here.

When the target flow is the specified flow, after receiving the flow table information output by flow recognizing module 101*c*, flow screening module 101*d* may determine whether the flow table information includes label information, recognize an information flow corresponding to the flow table information including the label information as a potential flow, and output the flow table information corresponding to the potential flow to off-chip memory 102 to be accumulated, so as to cache a larger amount of and more abundant flow table information.

In the present embodiments, flow screening module 101*d* may read the flow table information corresponding to the accumulated potential flow in off-chip memory 102 when the set trigger condition is met, and performs further recognition on the potential flow based on the read flow table information, so as to recognize the specified flow in the potential flow. For related descriptions about the set trigger condition, reference may be made to the foregoing embodiments, and details are not repeated here. For example, flow screening module 101*d* may determine whether the calculated quantity of messages in the flow table information carrying the label information is greater than a set threshold. If the calculated quantity of messages is greater than the set threshold, the potential flow is determined to be the specified flow. If the calculated quantity of messages is not greater than the set threshold, the potential flow is determined not to be the specified flow, but a misjudged information flow.

On the basis that main control chip 101 includes flow labeling module 101*e*, main control chip 101 cannot only recognize the specified flow, but also recognize the elephant flow, and even recognize the specified flow at the same time in the process of recognizing the elephant flow. The process of main control chip 101 simultaneously recognizing the elephant flow and the specified flow may be obtained with reference to the following cases.

In some embodiments, the target flow includes both the elephant flow and the specified flow.

In the present embodiments, an information flow entering network chip 100 first enters flow labeling module 101*e*, and flow labeling module 101*e* determines whether the message is a message in the specified flow according to feature information of the message. If the message is a message in the specified flow, label information is added to the message and the message with the added label information is sent into on-chip memory 101*a* for caching. If the message is not a message in the specified flow, the message is directly sent into on-chip memory 101*a* for caching. For details about adding the label information to the message by flow labeling module 101*e*, reference may be made to the description in previous embodiments in consistent with FIG. 1B, which may not be repeated here.

In the present implementations, the message entering network chip 100 may be cached in on-chip memory 101*a* no matter whether the label information is added thereto by flow labeling module 101*e* or not. On main control chip 101, flow classification module 101*b* may map the message cached in on-chip memory 101*a* to at least one piece of flow table information, and may output at least one piece of flow table information to flow recognizing module 101*c* when an output condition is met. The flow table information includes: the quantity of messages, the time stamp, and whether it includes the label information added by flow labeling module 101*e*. For the implementation in which flow classification module 101*b* maps the message cached in on-chip memory 101*a* to at least one piece of flow table information, reference may be made to the previous embodiments in consistent with FIG. 1A, and details are not repeated here.

In the present embodiments, flow recognizing module 101*c* recognizes a potential flow that is a possible target flow in the information flow according to the at least one piece of flow table information, and outputs the flow table information corresponding to the potential flow cached in the on-chip memory to the off-chip memory to be accumulated. In the present embodiments, when the target flow includes both the elephant flow and the specified flow, the potential flow recognized by the flow recognizing module 101*c* may include a potential elephant flow and/or a potential specified flow. For a piece of flow table information output by flow classification module 101*b*, flow recognizing module 101*c* may first recognize whether an information flow corresponding to the flow table information is a potential elephant flow, and then recognize whether the information flow is a potential specified flow; or first recognize whether the information flow corresponding to the flow table information is a potential specified flow, and then recognize whether the information flow is a potential elephant flow; or recognize whether the information flow corresponding to the flow table information is a potential elephant flow and a potential specified flow at the same time, which is not limited here.

Flow recognizing module 101*c* first recognizing whether the information flow corresponding to the flow table information is a potential elephant flow, and then recognizing whether the information flow is a potential specified flow is taken as an example. For example, each time when receiving flow table information output by flow classification module 101*b*, flow recognizing module 101*c* calculates the bandwidth of an information flow corresponding to the received flow table information according to the received flow table information, recognizes the information flow as a potential elephant flow when the bandwidth is greater than a set threshold, and outputs the flow table information corresponding to the potential elephant flow to off-chip memory 102 to be accumulated. When the bandwidth is less than or equal to the set threshold, whether the received flow table information includes label information can be further determined. If the label information is included, the information flow corresponding to the information flow corresponding to the flow table information is recognized as a potential specified flow, and the flow table information corresponding to the potential specified flow is output to off-chip memory 102. For another information flow that is not recognized as a potential flow, corresponding flow table information thereof may be deleted from on-chip memory 101*a*, so as to save the bandwidth of on-chip memory 101*a*.

Flow screening module 101*d* reads the flow table information corresponding to the accumulated potential flow in off-chip memory 102 when a set trigger condition is met. Flow screening module 101*d* may distinguish whether flow table information corresponding to a potential elephant flow or flow table information corresponding to a potential specified flow is read according to whether the read flow table information includes the label information. For the potential specified flow, flow screening module 101*d* may further determine whether the information flow is a specified flow according to the flow table information read from off-chip memory 102 and including the label information. For the potential element flow, flow screening module 101*d* may further determine whether the information flow is an elephant flow according to the flow table information read from off-chip memory 102 and not including the label information. Regarding the implementation of further recognizing the elephant flow and the specified flow, reference may be made to the descriptions in previous embodiments in consistent with FIG. 1A and FIG. 1B, and details are not repeated here.

In some embodiments, as shown in FIG. 1B, main control chip 101 is further provided with a processor 101*f*, and flow screening module d may report identification information of the target flow to processor 101*f* when the target flow is recognized. The identification information refers to information that can uniquely identify an information flow, such as a source IP address, a destination IP address, or a port number of the information flow, which is not limited.

In the present embodiments, after receiving the identification information of the target flow, processor 101*f* may perform various operations based on the identification information. In some embodiments, processor 10*f* may perform flow control on the target flow according to the identification information of the target flow. For example, if the target flow is an elephant flow, and the processor detects that the utilization rate of the processor exceeds a set threshold, for example, whether exceeding 90%. If the utilization rate of processor 101*f* exceeds the set threshold, in order to ensure the stability of processor 101*f*, processor 101*f* may perform flow-limiting processing on the elephant flow. In some embodiments, no matter the elephant flow or the mice flow may occupy a piece of flow table information, the flow table information is the basis for information flow forwarding, and entries of the flow table information integrate network configuration information of various level in the network, so that more abundant rules may be used during data forwarding. Generally, the flow table information is stored in off-chip memory 102. When an information flow arrives, the processor accesses off-chip memory 102, reads flow table information of the information flow, and performs corresponding operations. However, for the elephant flow, processor 101*f* needs to frequently access off-chip memory 102 to read the flow table information, and off-chip memory 102 has a low access bandwidth and low efficiency. Based on this, processor 101*f* may load the flow table information of the target flow from off-chip memory 102 to on-chip memory 101*a* according to the identification information of the target flow. The access bandwidth of on-chip memory 101*a* is higher than the access bandwidth of off-chip memory 102. Therefore, the efficiency of processor 101*f* may be improved. In some embodiments, after receiving the identification information of the target flow, processor 101*f* may perform accurate statistics on the target flow based on the identification information of the target flow, for example, calculate the bandwidth of the target flow, or perform interception, risk control, or special processing on the target flow.

In some embodiments of the present disclosure, network chip 100 may be implemented as a network card, and may be applied to a switch, a router, or a server in any network system to implement information flow sending and receiving, recognition, and other processing. A network card-based information flow recognition process in a data center system and a cloud computing system is introduced below.

Figure 2:
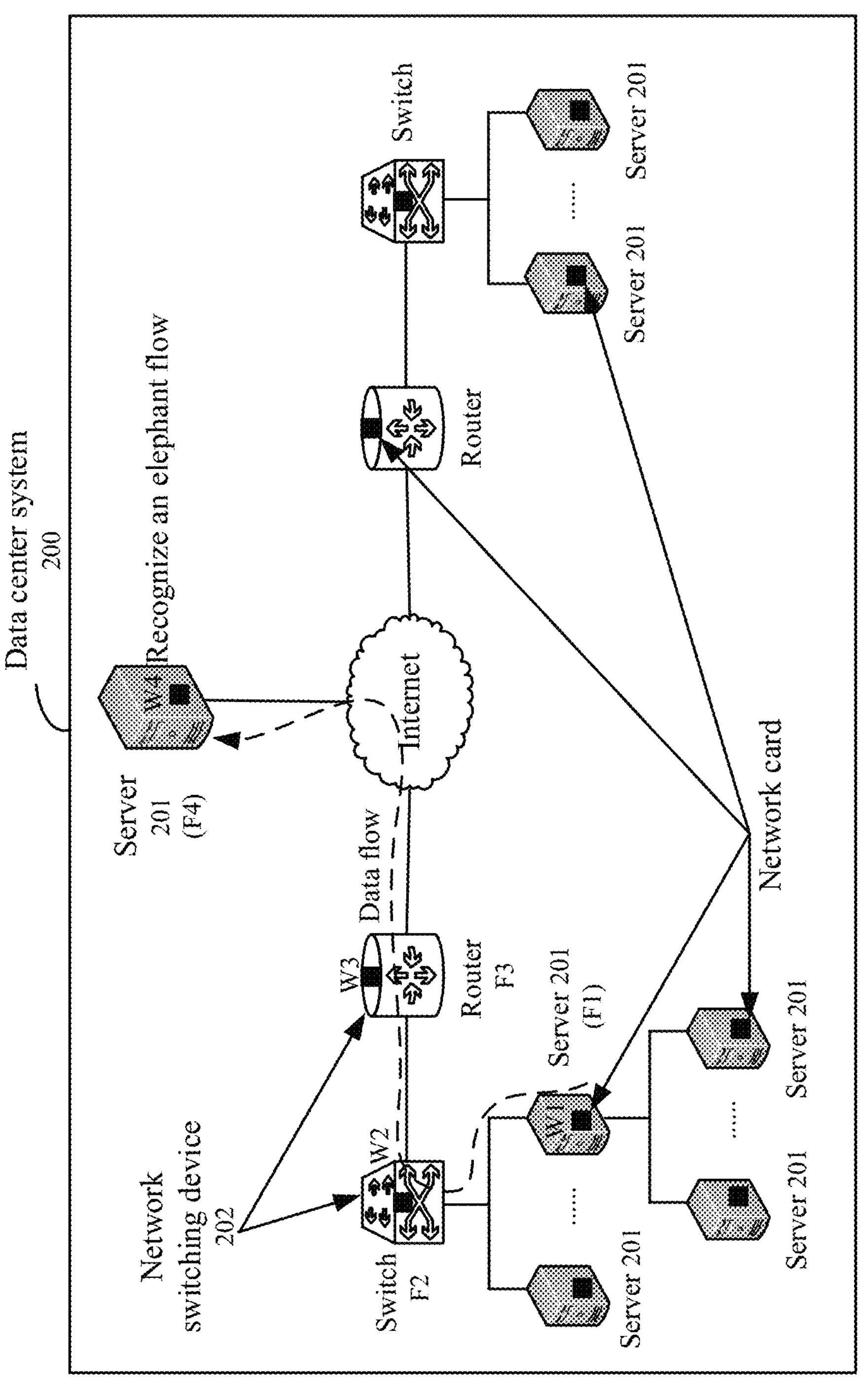
FIG. 2 is a schematic structural diagram of an exemplary data center system, according to some embodiments of the present disclosure.

FIG. 2 is a schematic structural diagram of an exemplary data center system 200, according to some embodiments of the present disclosure. As shown in FIG. 2, data center system 200 includes a plurality of servers 201 and a plurality of network switching devices 202. Server 201 is mainly configured to perform various computing tasks, and may be regarded as a terminal side device. Server 201 is only an example of a terminal side device, which is not limited thereto. Network switching device 202 is mainly configured to realize interconnection between servers 201, and may be regarded as a network side device. The plurality of servers 201 are interconnected through the plurality of network switching devices 202, and network data (such as various messages) between servers 201 may be forwarded through the network switching devices 202.

As shown in FIG. 2, one server 201 may be directly communicatively coupled to one, two, or more network switching devices 202, or be directly in communicatively coupled to another server 201, and use the other server 201 as a relay to be indirectly communicatively coupled to one, two, or more network switching devices 202. The communicatively coupled here may be a wired connection or a wireless connection.

It should be noted that, in addition to servers 201 and network switching devices 202, data center system 200 further includes some photoelectric lines for implementing interconnection between servers 201 and network switching devices 202. In the present embodiments, quantity of servers 201 and the quantity of network switching devices 202 are not limited, and may be determined by the scale of the data center system. For example, in some large-scale data center systems, a single cluster may include thousands of network switching devices, tens of thousands of servers, and hundreds of thousands of photoelectric circuits.

In the present embodiments, the implementation form of network switching device 202 is not limited, may be any device with functions such as device interconnection, data exchange, and forwarding, and may include, for example, a router, a switch, a hub, or the like. For example, in the data center system shown in FIG. 2, network switching device 202 includes, but is not limited to, a switch and a router.

In the present embodiments, as shown in FIG. 2, along the dash arrow, an application program is installed on a server 201 (F1). The application program may generate data, and the data generated by the application program may reach a network card W1 on the server 201 (F1) after being processed by various layers. Network card W1 encapsulates the data into a message, and sends the message to a switch F2 through a photoelectric link between Network card W1 and switch F2. Switch F2 has a network card W2. After receiving the message, network card W2 recognizes that the message needs to be forwarded to a server 201 (F4). The data packet may be forwarded to the server 201 (F4) via a router F3 and a network card W3 of router F3. After receiving the message, network card W4 on server 201 (F4) provides the message to a processor of server 201 (F4), and the message is further processed by the processor from the perspective of software.

In the present embodiments, in order to realize functions such as load balancing, congestion control, and network anomaly detection, the server needs to recognize an elephant flow when transmitting an information flow. After the elephant flow is recognized, flow control of the elephant flow may be performed, or flow table information of the elephant flow may be loaded from the off-chip memory to the on-chip memory, for improving the efficiency of the data center system. Each server 201 and network switching device 202 include a network chip, and the internal structure of the network chip may be obtained with reference to the aforementioned embodiments in consistent with FIG. 1A or FIG. 1B, which may not be described in detail here. A process of recognizing the elephant flow is described in detail may be described in detail below by using network card W4 on server 201 (F4).

After receiving the message on the network link, network card W4 temporarily caches the message in the on-chip memory. Each time when there is a new message cached in the on-chip memory, the flow classification module in network card W4 hashes feature information of the message by using a hash function to obtain a hash result V of the new message. If there is a target entry corresponding to the hash result V in the hash table, the new message is mapped to the target entry, the quantity of messages in the flow table information in the target entry is increased by 1, and a time stamp of the message is recorded. If there is no target entry corresponding to the hash result V in the hash table, an idle entry is acquired from the hash table, the new message is mapped to the idle entry, the quantity of messages in the idle entry is increased by 1, and a time stamp of the message is recorded. If there is no idle entry in the hash table, the quantity of messages and the time stamp of the message recorded in an entry having the largest quantity of messages in the hash table are output to the flow recognizing module in network card W4, so as to obtain a blank entry. The quantity of messages and the time stamp of the message recorded in the entry belong to the flow table information corresponding to the information flow, which may be all or part of the flow table information, which is not limited.

Each time when receiving the quantity of messages and the message time stamp that are output by the flow classification module, the flow recognizing module calculates the bandwidth of the corresponding information flow according to a ratio of the received quantity of messages to a message time stamp difference, and when the bandwidth is greater than a set elephant flow threshold, the information flow is recognized as a potential elephant flow, and flow table information such as the quantity of messages and time stamp corresponding to the potential information flow cached in the on-chip memory is output to the off-chip memory to be accumulated.

As time goes by, there are increasingly more flow table information corresponding to the potential flow in the off-chip memory, and the flow screening module may read the flow table information corresponding to the potential elephant flow stored in the off-chip memory at intervals, and calculate the bandwidth of the potential flow. If the bandwidth of the potential flow exceeds the set elephant flow bandwidth threshold, the potential flow is considered as an elephant flow.

After recognizing the elephant flow, the flow screening module may provide identification information of the elephant flow to the processor, and the processor may load the flow table information of the elephant flow corresponding to the identification information from the off-chip memory to the on-chip memory based on the identification information, and monitor a utilization rate of the processor. When the utilization rate of the processor exceeds 90%, the elephant flow is limited to prevent network congestion.

Figure 3:
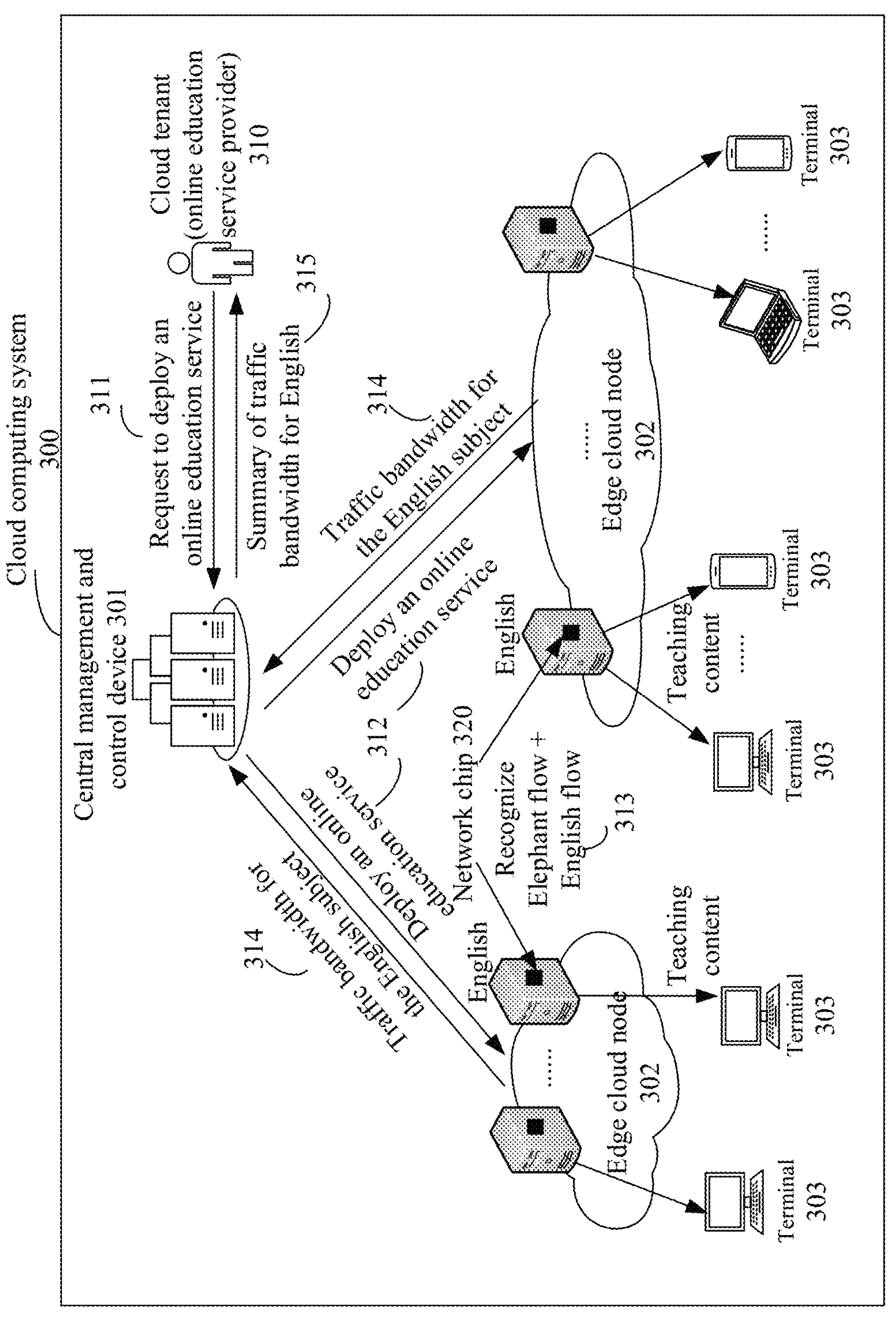
FIG. 3 is a schematic structural diagram of an exemplary cloud computing system, according to some embodiments of the present disclosure.

FIG. 3 is a schematic structural diagram of an exemplary cloud computing system 300, according to some embodiments of the present disclosure. As shown in FIG. 3, cloud computing system 300 includes a central management and control device 301, at least one edge cloud node 302, and at least one terminal 303. Each edge cloud node 302 includes a series of edge infrastructures, including but not limited to: a distributed data center (DC), a wireless computer room or cluster, a communication network of an operator, a core network device, a base station, an edge gateway, a home gateway, a computing device, and/or storage device, and other edge devices and corresponding network environments, and the like. It should be noted here that locations, capabilities, and included infrastructures of different edge cloud nodes 302 may be the same or different. For edge cloud node 302, it may provide various resources externally, for example, computing resources such as CPU and GPU, storage resources such as memory and hard disk, network resources such as bandwidth, and the like.

In the present embodiments, cloud computing system 300 is used as an example to implement load balancing, flow control, and the like, and there may be migration of virtual machines, cloud computing services, or data. In the entire process, elephant flows may be generated. Since in a queue at an export terminal of a network switch, a mice flow often follows an elephant flow, which causes a long-term queue delay. In order to optimize or ensure the performance and improve the delay, it is very important to recognize an elephant flow.

In some embodiments, a tenant 310 on the cloud may submit a request 311 for deploying a cloud computing service to central management and control device 301 through a human-computer interaction interface provided by central management and control device 301. The cloud computing service may be a short video service, an online education service, an online live streaming service, a game service, or the like, and central management and control device 301 selects a suitable edge cloud node 302 for cloud tenant 310, deploys a cloud computing service 312 for cloud tenant 310 on edge cloud node 302. Terminal 303 may use the cloud computing service deployed on the nearest edge cloud node 302. In FIG. 3, for example, the cloud tenant 310 is an online education service provider, and an online education service for a plurality of subjects such as Chinese, mathematics, and English is deployed on edge cloud node 302. The online education service provider 310 hopes to focus on the traffic bandwidth of the English subject.

In some embodiments, if the cloud tenant 310 hopes to acquire the traffic bandwidth of the English subject, the cloud tenant 310 may send a request of acquiring the traffic bandwidth of the English subject to central management and control device 301, and central management and control device 301 may deliver, according to the deployment of the English subject on edge cloud node 302, feature information of an information flow of the English subject to a server deployed with the online education service of the English subject in edge cloud node 302. The server includes a network chip 320, and the feature information of the information flow of the English subject is specifically delivered to network chip 320. According to the request of the terminal user, the online education service of the English subject provides the terminal user with teaching content of the English subject through network chip 320. For example, network chip 320 receives a message provided by the online education service of the English subject, and recognizes 313, based on the feature information of the information flow corresponding to the English subject, whether the message belongs to the information flow corresponding to the English subject.

Figure 4:
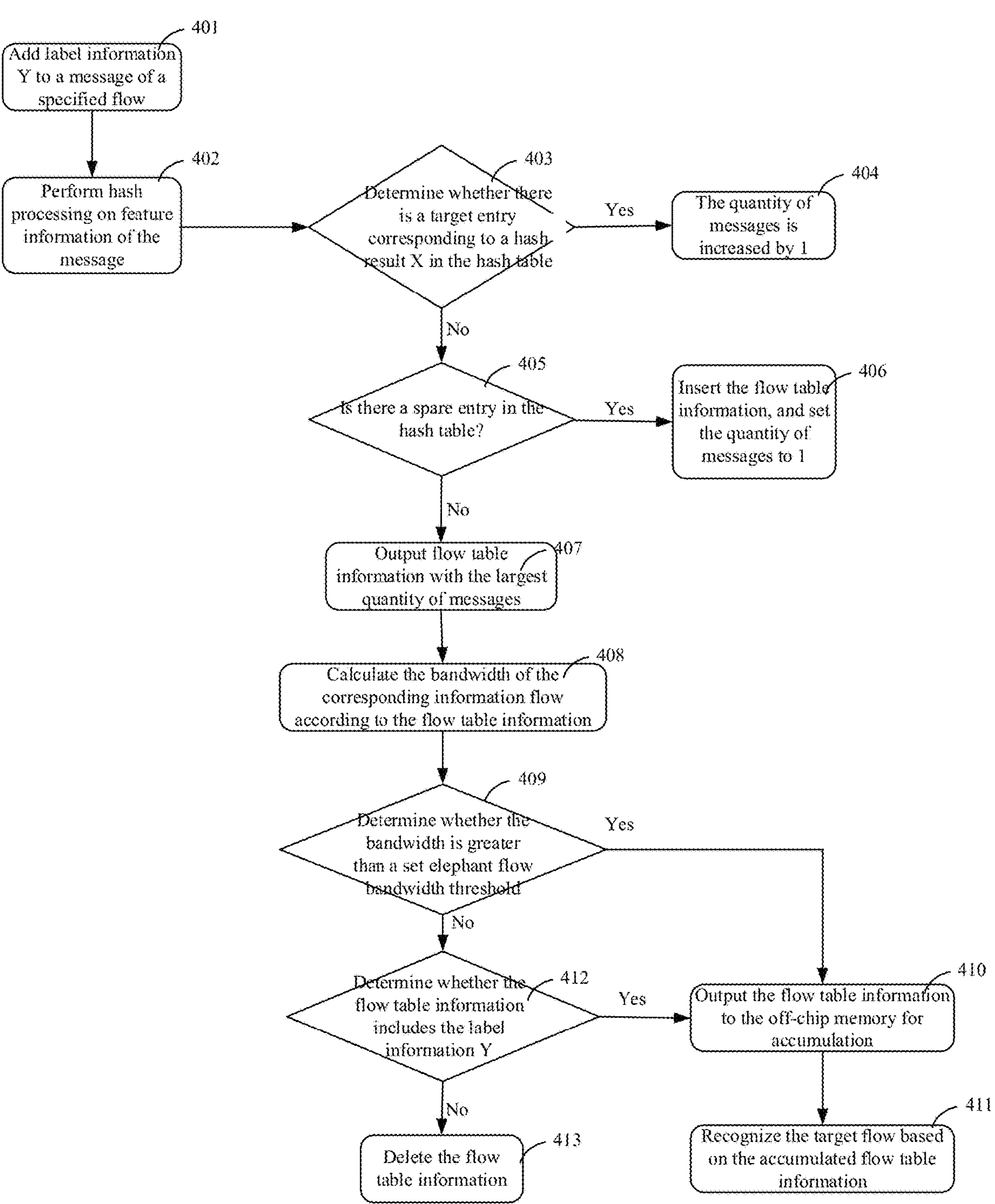
FIG. 4 is a schematic diagram of an exemplary information flow recognition process, according to some embodiments of the present disclosure.

FIG. 4 is a schematic diagram of an exemplary information flow recognition process, according to some embodiments of the present disclosure. Referring to FIG. 4, if message belongs to the information flow corresponding to the English subject, at step 401, label information Y is added to the message. The label information Y may uniquely label the information flow corresponding to the English subject. For example, when receiving the message, the flow labeling module may extract feature information from the message, and compare the feature information extracted from the message with the feature information of the message in the specified flow stored locally. If the feature information extracted from the message and the feature information of the message in the specified flow stored locally are the same, the message is determined to belong to the specified flow, label information is added in the message, and the message with the label information added is sent into the on-chip memory for caching. If the feature information extracted from the message and the feature information of the message in the specified flow stored locally are different, the message is directly sent into the on-chip memory for caching.

As shown in FIG. 4, each time when a new message is cached in the on-chip memory, at step 402, feature information of the new message is hashed by using a hash function to obtain a hash result X of the new message by the flow classification module. At step 403, whether there is a target entry corresponding to the hash result X in a hash table is determined. If there is a target entry corresponding to the hash result X in the hash table, at step 404, the new message is mapped to the target entry, and the quantity of messages in the flow table information in the target entry is increased by 1. If there is no target entry corresponding to the hash result X in the hash table, at step 405, it is determined whether there is a spare entry in the hash table. If there is a spare entry in the hash table, at step 406, an idle entry is acquired from the hash table, the new message is mapped to the idle entry, flow table information is inserted into the idle entry, and the quantity of messages is set to 1. If there is no idle entry in the hash table, at step 407, flow table information recorded in an entry with the largest quantity of messages in the hash table is output to the flow recognizing module to obtain a blank entry. The flow table information includes: the quantity of messages, a time stamp of the message, and whether the message carries label information. The flow table information of the information flow corresponding to the English subject includes the label information Y, and flow table information of an information flow corresponding to a non-English subject does not include the label information Y.

Referring to FIG. 4, each time when receiving the flow table information output by the flow classification module, at step 408, the bandwidth of the corresponding information flow is calculated according to the ratio of the quantity of messages in the received flow table information to the message time stamp difference the flow recognizing module, and at step 409 whether the calculated bandwidth is greater than the set elephant flow bandwidth threshold is determined. If the bandwidth is greater than the set elephant flow bandwidth threshold, the information flow is recognized as a potential elephant flow, and at step 410, flow table information corresponding to the potential elephant flow cached in the on-chip memory is output to the off-chip memory to be accumulated, and at step 411, the target flow is recognized based on the accumulated flow table information. If the bandwidth is less than or equal to the set elephant flow bandwidth threshold, at step 412, it is further determined whether the flow table information includes label information. If the label information is included, an information flow corresponding to the flow table information is considered as a specified flow of the English subject, and steps 410 and 411 are performed. If the flow table information does not include the label information, at step 413, the flow table information corresponding to the flow table information in the on-chip memory is deleted.

As time goes by, there are increasingly more flow table information corresponding to the potential flow in the off-chip memory, and the flow screening module may read the flow table information corresponding to the potential flow stored in the off-chip memory at intervals, and recognize a true elephant flow and a specified flow therefrom. After recognizing the true elephant flow and the specified flow, the flow screening module may provide identification information of the elephant flow and the specified flow to the processor. On the one hand, based on the received identification information, the processor may load the flow table information of the elephant flow corresponding to the identification information from the off-chip memory to the on-chip memory, and monitor a utilization rate of the processor. When the utilization rate of the processor exceeds 90%, the elephant flow is limited to prevent network congestion. On the other hand, the processor may also perform accurate statistics on the traffic bandwidth of the specified English subject. Further, referring back to FIG. 3, the processor provides the traffic bandwidth of the English subject 314 to the central management and control device 301 through the network connection between the edge cloud node 302 and the central management and control device 301. The central management and control device 301 summarizes the traffic bandwidth of a plurality of edge cloud nodes 302, and returns a summary result 315 to the online education service provider 310.

Figure 5:
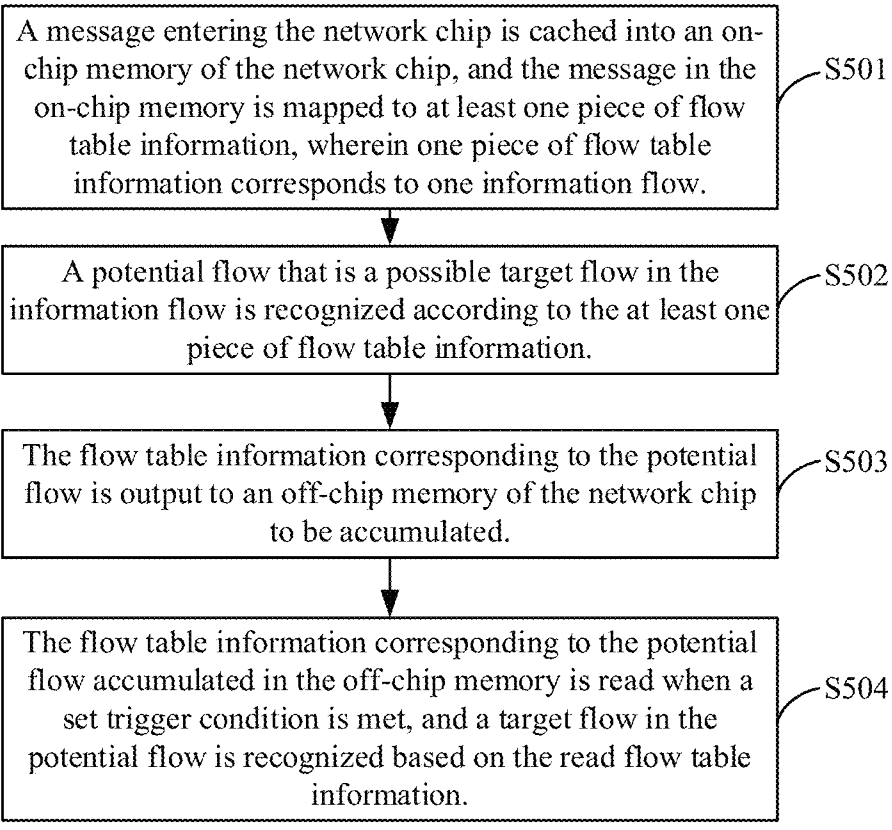
FIG. 5 is a schematic flow chart of an exemplary information flow recognition method, according to some embodiments of the present disclosure.

In the present embodiments, in addition to providing a network chip, an information flow recognition method is further provided, the method is applicable to a main control chip in a network chip. As shown in FIG. 5, the method includes steps S501 to S504.

At step S501, a message entering the network chip is cached into an on-chip memory of the network chip, and the message in the on-chip memory is mapped to at least one piece of flow table information, wherein one piece of flow table information corresponds to one information flow.

At step S502, a potential flow that is a possible target flow in the information flow is recognized according to the at least one piece of flow table information.

At step S503, the flow table information corresponding to the potential flow is output to an off-chip memory of the network chip to be accumulated.

At step S504, the flow table information corresponding to the potential flow accumulated in the off-chip memory is read when a set trigger condition is met, and a target flow in the potential flow is recognized based on the read flow table information.

In some embodiments, the method provided in the present embodiments further includes: performing accurate statistics on the target flow according to the identification information of the target flow when the target flow is recognized, or performing flow control on the target flow, or loading the flow table information of the target flow from the off-chip memory to the on-chip memory.

In some embodiments, mapping the message in the on-chip memory to at least one piece of flow table information includes: mapping the message in the on-chip memory to a hash table in the on-chip memory by using a hash function, wherein one entry in the hash table corresponds to one information flow, and the entry records corresponding flow table information.

In some embodiments, mapping the message in the on-chip memory to a hash table in the on-chip memory by using a hash function includes: hashing, each time when a new message is cached in the on-chip memory, feature information of the new message by using the hash function to obtain a hash result of the new message; if there is a target entry corresponding to the hash result in the hash table, mapping the new message to the target entry and updating flow table information in the target entry; and if there is no target entry corresponding to the hash result in the hash table, acquiring an idle entry from the hash table, mapping the new message to the idle entry, and recording flow table information of an information flow to which the new message belongs in the idle entry.

In some embodiments, the method provided in the present embodiments further includes: if there is no idle entry in the hash table, acquiring flow table information in an entry meeting an output condition in the hash table, and deleting the flow table information after outputting the entry information to obtain a blank entry.

In some embodiments, acquiring the flow table information in the entry meeting the output condition in the hash table includes: acquiring flow table information in an entry with the largest quantity of messages in the hash table.

In some embodiments, recognizing the potential flow that is a possible target flow in the information flow according to the at least one piece of flow table information includes: calculating the bandwidth of an information flow corresponding to the acquired flow table information according to the acquired flow table information bandwidth, and recognizing the information flow as a potential flow if the bandwidth is greater than a set threshold.

In some embodiments, before the message entering the network chip is cached into the on-chip memory, according to the feature information of the message, whether the message is a message in the specified flow is determined. If the message is a message in the specified flow, label information is added to the message. Correspondingly, recognizing the potential flow that is a possible target flow in the information flow according to the at least one piece of flow table information includes: determining whether at least one piece of flow table information includes label information, and recognizing the information flow corresponding to the flow table information including the label information as a potential flow.

In the embodiments of the present disclosure, a combination of an on-chip memory and an off-chip memory is used for recognizing an information flow. A message entering a network chip is cached in the on-chip memory, the cached message is mapped to at least one piece of flow table information in the chip, and a potential flow that is a possible target flow in the information flow is recognized, then the flow table information corresponding to the potential flow is cached to the off-chip memory to be accumulated, until a set trigger condition is met, the flow table information corresponding to the potential flow cached in the off-chip memory is read to accurately recognize the target flow in the potential flow accordingly. Firstly, a potential flow is recognized by taking advantage of a large access bandwidth of the on-chip memory, which can increase the speed of recognizing the potential flow. Secondly, only the flow table information of the potential flow is accumulated by taking advantage of a large storage space of the off-chip memory, and the potential flow is further recognized, rather than further recognizing all information flows by the off-chip memory, which can reduce the number of accesses to the off-chip memory and help improve the efficiency and accuracy of recognizing a target flow.

It should be noted that, the steps of the method provided in the above embodiments may all be performed by the same device, or the method may also be performed by different devices. For example, step S501 to step S503 may be performed by a device A, for another example, steps S501 and S502 may be performed by a device A, and step S503 may be performed by a device B, or the like.

In addition, in some of the processes described in the above embodiments and accompanying drawings, a plurality of operations appearing in a specific order are included, but it should be clearly understood that these operations may not be performed in the order herein or performed in parallel, serial numbers of the operations, such as S501 and S502, are only used for distinguishing different operations, and the serial numbers themselves do not represent any performing order. Additionally, these processes may include more or fewer operations, and these operations may be performed sequentially or in parallel.

Figure 6:
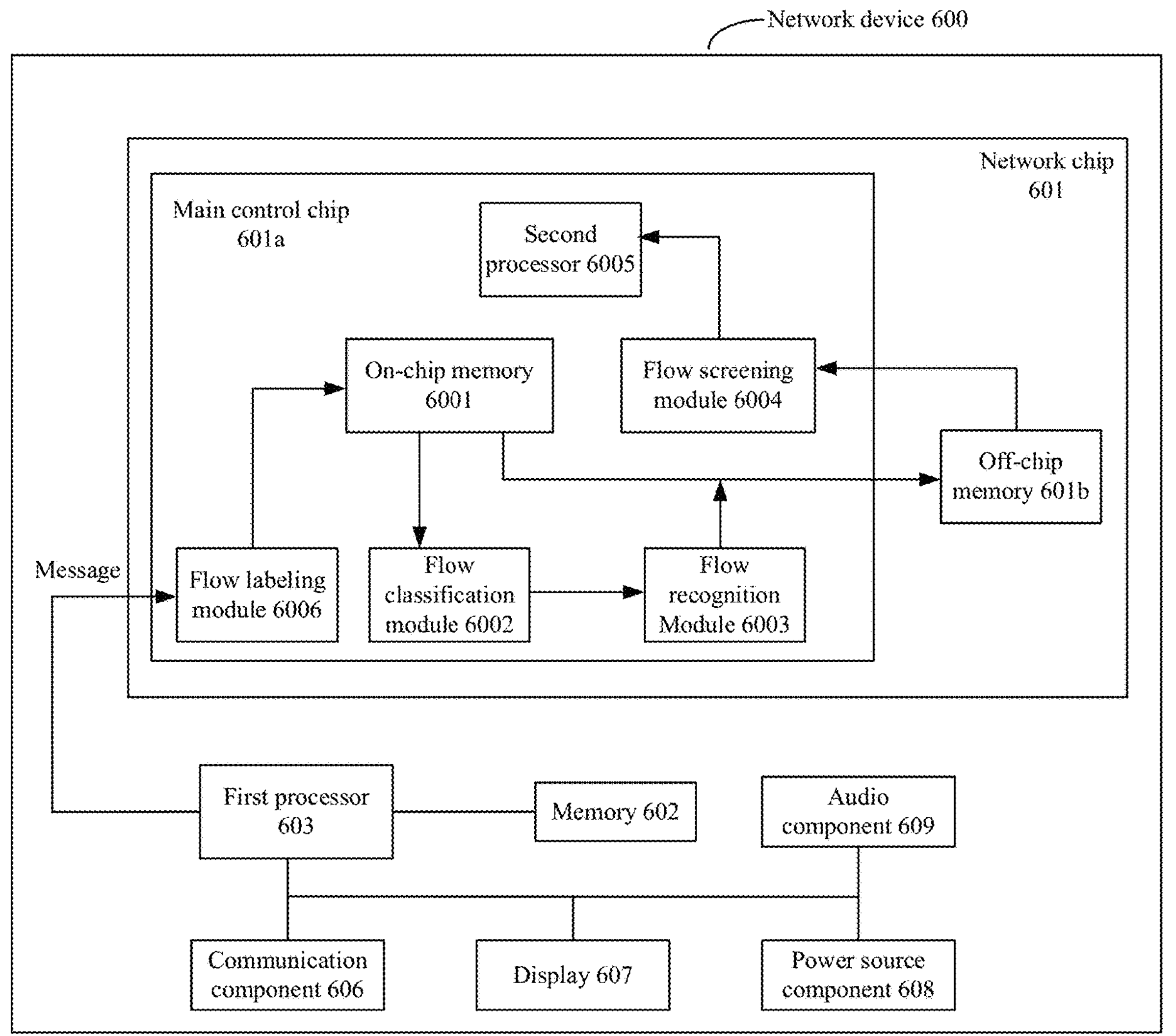
FIG. 6 is a schematic flow chart of an exemplary network device, according to some embodiments of the present disclosure.

FIG. 6 is a schematic structural diagram of an exemplary network device 600, according to some embodiments of the present disclosure. As shown in FIG. 6, network device 600 includes: a network chip 601, a memory 602, and a first processor 603. Network chip 601 includes a main control chip 601*a* and an off-chip memory 601*b*, and main control chip 601*a* includes an on-chip memory 6001, a flow classification module 6002, a flow recognizing module 6003, and a flow screening module 6004. In some embodiments, as shown in FIG. 6, main control chip 601*a* further includes: a second processor 6005 and a flow labeling module 6006. First processor 603 refers to a processor of the network device, which may be regarded as a device processor. Second processor 6005 refers to a processor on main control chip 601*a* in network chip 601, which may be regarded as an on-chip memory.

Memory 602 is configured to store a computer program, and may be configured to store other various types of data to support operations on network devices. Examples of such data include instructions for any application or method operated on a network device.

Memory 602 may be realized by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

First processor 603 is coupled to memory 602 and is configured to execute a computer program in memory 602, so as to: send a message to network chip 601 and/or receive information of a target flow reported by network chip 601. On-chip memory 6001 is configured to cache a message entering the network chip. Flow classification module 6002 has circuitry that is configured to map the message in the on-chip memory to at least one piece of flow table information, and provide at least one piece of flow table information to the flow recognizing module. Flow recognizing module 6003 has circuitry that is configured to recognize a potential flow that is a possible target flow in the information flow according to the at least one piece of flow table information, and output the flow table information corresponding to the potential flow cached in the on-chip memory to the off-chip memory to be accumulated. Flow screening module 6004 has circuitry that is configured to read the flow table information corresponding to the potential flow accumulated in the off-chip memory when a set trigger condition is met, and recognize a target flow in the potential flow based on the read flow table information.

In some embodiments, flow screening module 6004 has circuitry that is further configured to: report identification information of the target flow to second processor 6005 when the target flow is recognized. Second processor 6005 is configured to perform accurate statistics on the target flow according to the identification information of the target flow, or perform flow control on the target flow, or load flow table information of the target flow from the off-chip memory to the on-chip memory.

In some embodiments, when mapping the message in the on-chip memory to at least one piece of flow table information, flow classification module 6002 has circuitry that is configured to map the message in the on-chip memory to a hash table cached in the on-chip memory by using a hash function, wherein one entry in the hash table corresponds to one information flow, and the entry records flow table information of the corresponding information flow.

In some embodiments, when mapping the message in the on-chip memory to a hash table in the on-chip memory by using a hash function, flow classification module 6002 has circuitry that is configured to hash, each time when a new message is cached in the on-chip memory, feature information of the new message by using the hash function to obtain a hash result of the new message; if there is a target entry corresponding to the hash result in the hash table, map the new message to the target entry and update flow table information in the target entry; and if there is no target entry corresponding to the hash result in the hash table, acquire an idle entry from the hash table, map the new message to the idle entry, and record flow table information of an information flow to which the new message belongs in the idle entry.

In some embodiments, when outputting at least one piece of flow table information to the flow recognizing module, flow classification module 6002 has circuitry that is configured to output, if there is no idle entry in the hash table, flow table information in an entry meeting an output condition in the hash table to flow recognizing module 6003 to obtain a blank entry.

In some embodiments, when outputting the flow table information in the entry meeting the output condition in the hash table to the flow recognizing module, flow classification module 6002 has circuitry that is configured to output the flow table information in an entry with the largest quantity of messages in the hash table to the flow recognizing module.

In some embodiments, when recognizing a potential flow that is a possible target flow in the information flow according to at least one piece of flow table information, flow recognizing module 6003 has circuitry that is further configured to calculate, each time when the flow table information output by the flow classification module is received, a bandwidth of an information flow corresponding to the received flow table information according to the received flow table information, and recognize the information flow as a potential flow when the bandwidth is greater than a set threshold.

In some embodiment, flow labeling module 6006 has circuitry that is configured to determine, before caching the message entering the network chip into the on-chip memory, whether the message is a message in a specified flow according to the feature information of the message, and if the message is a message in a specified flow, add label information to the message, wherein the label information is a type of information in the flow table information. When recognizing a potential flow that is a possible target flow in the information flow according to at least one piece of flow table information, flow recognizing module 6003 has circuitry that is further configured to determine whether at least one piece of flow table information includes label information, and recognize the information flow including the label information in the flow table information as a potential flow.

In some embodiments, network chip 601 is a network card.

In the network device provided in the embodiments of the present disclosure, a combination of an on-chip memory and an off-chip memory is used for recognizing an information flow. First, a message entering a network chip is cached in the on-chip memory, the message is mapped to at least one piece of flow table information in the chip, and a potential flow that is a possible target flow in the information flow is recognized accordingly, then the flow table information corresponding to the potential flow is cached to the off-chip memory to be accumulated, until a set trigger condition is met, the flow table information of the potential flow accumulated in the off-chip memory is read to accurately recognize the target flow in the potential flow accordingly. Firstly, a potential flow is recognized by taking advantage of a large access bandwidth of the on-chip memory, which can increase the speed of recognizing the potential flow. Secondly, only the potential flow is further recognized by taking advantage of a large storage space of the off-chip memory, rather than further recognizing all information flows by the off-chip memory, which can reduce the number of accesses to the off-chip memory and help improve the efficiency and accuracy of recognizing a target flow.

Further, as shown in FIG. 6, the network device further includes: a communication component 606, a display 607, a power supply component 608, an audio component 609, and other components. FIG. 6 only schematically shows some components, which does not mean that the network device only includes the components shown in FIG. 6. It should be noted that a component in a dotted line box in FIG. 6 is an optional component rather than a mandatory component, specifically depending on a product form of the network device.

Communication component 606 in FIG. 6 is configured to facilitate wired or wireless communication between a device where the communication component is located and other devices. The device where the communication component is located may access a wireless network based on a communication standard, such as WiFi, 2G, 3G, 4G/LTE, 5G, and other mobile communication networks, or a combination thereof In an example embodiment, the communication component receives a broadcast signal or broadcast related information from an external broadcast management system via a broadcast channel. In an example, the communication component further includes a near field communication (NFC) module to facilitate short-range communication. For example, the NFC module may be implemented based on the radio frequency identification (RFID) technology, infrared data association (IrDA) technology, ultra-wideband (UWB) technology, Bluetooth (BT) technology, and other technologies.

Display 607 in FIG. 6 includes a screen, and the screen may include a liquid crystal display (LCD) and a touch panel (TP). If the screen includes a touch panel, the screen may be implemented as a touch screen to receive an input signal from a user. The touch panel includes one or more touch sensors to sense touches, swipes, and gestures on the touch panel. The touch sensor may not only sense a boundary of a touch or swipe action, but also detect a duration and pressure associated with the touch or swipe operation.

Power supply component 608 in FIG. 6 provides power for various components of a device where the power supply component is located. The power supply component may include a power management system, one or more power supplies, and other components associated with generating, managing, and distributing power for the device where the power supply component is located.

Audio component 609 in FIG. 6 may be configured to output and/or input an audio signal. For example, the audio component includes a microphone (MIC), and the microphone is configured to receive an external audio signal when the device where the audio component is located is in an operation mode, such as a call mode, a recording mode, and a speech recognition mode. The received audio signal may be further stored in the memory or sent via the communication component. In some embodiments, the audio component further includes a speaker for outputting the audio signal.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A network chip, comprising:

a main control chip and an off-chip memory, wherein the main control chip comprises:

an on-chip memory configured to cache a message entering the network chip;

a flow classification module having circuitry configured to map the message in the on-chip memory to at least one piece of flow table information, wherein one piece of flow table information corresponds to one information flow;

a flow recognizing module having circuitry configured to recognize a potential flow that is a possible target flow in the information flow according to the at least one piece of flow table information, and output the flow table information corresponding to the potential flow to the off-chip memory to be accumulated; and a flow screening module having circuitry configured to read the flow table information corresponding to the potential flow accumulated in the off-chip memory when a set trigger condition is met, and recognize a target flow in the potential flow based on the read flow table information.

2. The network chip according to claim 1, wherein the main control chip is further provided with a processor;

the flow screening module includes circuitry configured to report identification information of the target flow to the processor when the target flow is recognized; and the processor is configured to perform accurate statistics on the target flow according to the identification information of the target flow; or perform flow control on the target flow; or load the flow table information of the target flow from the off-chip memory to the on-chip memory.

3. The network chip according to claim 1, wherein the flow classification module includes circuitry configured to:

map the message in the on-chip memory to a hash table in the on-chip memory by using a hash function, wherein an entry in the hash table records the flow table information of the corresponding information flow.

4. The network chip according to claim 3, wherein the flow classification module includes circuitry configured to:

perform, each time when a new message is cached in the on-chip memory, hash processing on feature information of the new message by using a hash function to obtain a hash result of the new message;

map, if there is a target entry corresponding to the hash result in the hash table, the new message to the target entry, and update flow table information in the target entry;

acquire, if there is no target entry corresponding to the hash result in the hash table, an idle entry from the hash table, map the new message to the idle entry, and record flow table information of the information flow to which the new message belongs in the idle entry.

5. The network chip according to claim 4, wherein the flow classification module includes circuitry configured to:

output, if there is no idle entry in the hash table, flow table information in an entry meeting an output condition in the hash table to the flow recognizing module to obtain a blank entry.

6. The network chip according to claim 5, wherein the flow classification module includes circuitry configured to:

output flow table information in an entry corresponding to the largest quantity of messages in the hash table to the flow recognizing module.

7. The network chip according to claim 5, wherein the flow recognizing module includes circuitry configured to:

calculate, each time when receiving the flow table information output by the flow classification module, a bandwidth of an information flow corresponding to the received flow table information according to the received flow table information; and recognize the information flow as a potential flow when the bandwidth is greater than a set threshold.

8. The network chip according to claim 1, further provided with a flow labeling module having circuitry configured to:

determine, before caching the message entering the network chip into the on-chip memory, whether the message entering the network chip is a message in a specified flow according to feature information of the message; and if the message entering the network chip is the message in a specified flow, add label information to the message, wherein the label information is a type of information in the flow table information; and the flow recognizing module includes circuitry configured to:

determine whether the at least one piece of flow table information comprises the label information; and recognize an information flow corresponding to the flow table information comprising the label information as a potential flow.

9. The network chip according to claim 1, wherein the network chip is a network card.

10. An information flow recognition method, applicable to a main control chip in a network chip, the method comprising:

caching a message entering the network chip into an on-chip memory of the network chip, and mapping the message in the on-chip memory to at least one piece of flow table information, wherein one piece of flow table information corresponds to one information flow;

recognizing a potential flow that is a possible target flow in the information flow according to the at least one piece of flow table information;

outputting the flow table information corresponding to the potential flow to an off-chip memory of the network chip to be accumulated; and reading the flow table information corresponding to the potential flow accumulated in the off-chip memory when a set trigger condition is met, and recognizing a target flow in the potential flow based on the read flow table information.

11. A network device, comprising:

a memory configured to store a computer program;

a first processor coupled to the memory and configured to execute the computer program, for sending a message to a network chip and/or receiving identification information of a target flow reported by the network chip; and the network chip comprising a main control chip and an off-chip memory, wherein the main control chip comprises:

an on-chip memory configured to cache a message entering the network chip;

a flow classification module having circuitry configured to map the message in the on-chip memory to at least one piece of flow table information, wherein one piece of flow table information corresponds to one information flow;

a flow recognizing module having circuitry configured to recognize a potential flow that is a possible target flow in the information flow according to the at least one piece of flow table information, and output the flow table information corresponding to the potential flow to the off-chip memory to be accumulated; and a flow screening module having circuitry configured to read the flow table information corresponding to the potential flow accumulated in the off-chip memory when a set trigger condition is met, and recognize a target flow in the potential flow based on the read flow table information.

12. The network device according to claim 11, wherein the main control chip is further provided with a second processor;

the flow screening module includes circuitry configured to report identification information of the target flow to the processor when the target flow is recognized; and the second processor is configured to perform accurate statistics on the target flow according to the identification information of the target flow; or perform flow control on the target flow; or load the flow table information of the target flow from the off-chip memory to the on-chip memory.

13. The network device according to claim 11, wherein the flow classification module includes circuitry configured to:

map the message in the on-chip memory to a hash table in the on-chip memory by using a hash function, wherein an entry in the hash table records the flow table information of the corresponding information flow.

14. The network device according to claim 13, wherein the flow classification module includes circuitry configured to:

perform, each time when a new message is cached in the on-chip memory, hash processing on feature information of the new message by using a hash function to obtain a hash result of the new message;

map, if there is a target entry corresponding to the hash result in the hash table, the new message to the target entry, and update flow table information in the target entry;

acquire, if there is no target entry corresponding to the hash result in the hash table, an idle entry from the hash table, map the new message to the idle entry, and record flow table information of the information flow to which the new message belongs in the idle entry.

15. The network device according to claim 14, wherein the flow classification module includes circuitry configured to:

output, if there is no idle entry in the hash table, flow table information in an entry meeting an output condition in the hash table to the flow recognizing module to obtain a blank entry.

16. The network device according to claim 15, wherein the flow classification module includes circuitry configured to:

output flow table information in an entry corresponding to the largest quantity of messages in the hash table to the flow recognizing module.

17. The network device according to claim 15, wherein the flow recognizing module includes circuitry configured to:

calculate, each time when receiving the flow table information output by the flow classification module, a bandwidth of an information flow corresponding to the received flow table information according to the received flow table information; and recognize the information flow as a potential flow when the bandwidth is greater than a set threshold.

18. The network device according to claim 11, wherein the network chip is further provided with a flow labeling module having circuitry configured to:

determine, before caching the message entering the network chip into the on-chip memory, whether the message entering the network chip is a message in a specified flow according to feature information of the message; and if the message entering the network chip is the message in a specified flow, add label information to the message, wherein the label information is a type of information in the flow table information; and the flow recognizing module includes circuitry configured to:

determine whether the at least one piece of flow table information comprises the label information; and recognize an information flow corresponding to the flow table information comprising the label information as a potential flow.

19. The network device according to claim 11, wherein the network chip is a network card.

* * * * *